July 10, 1956

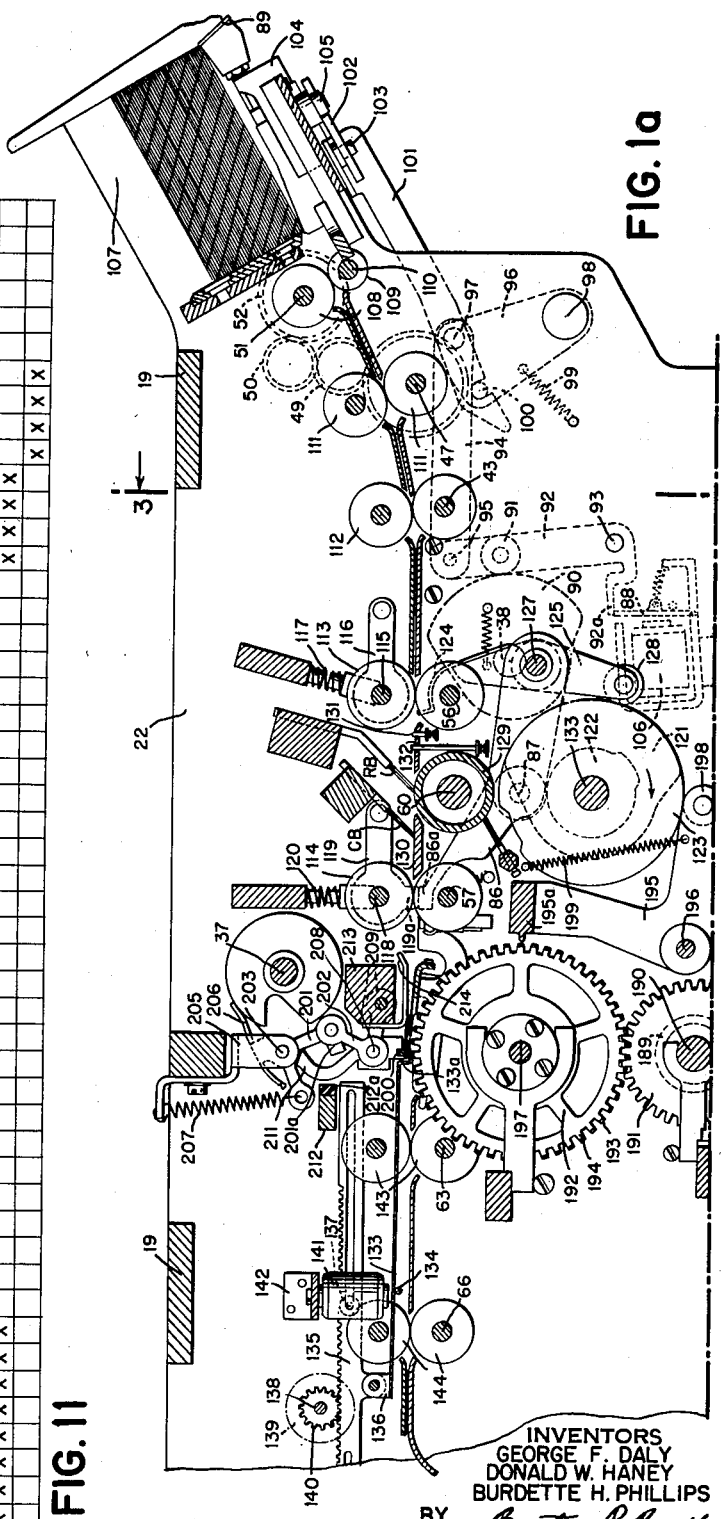

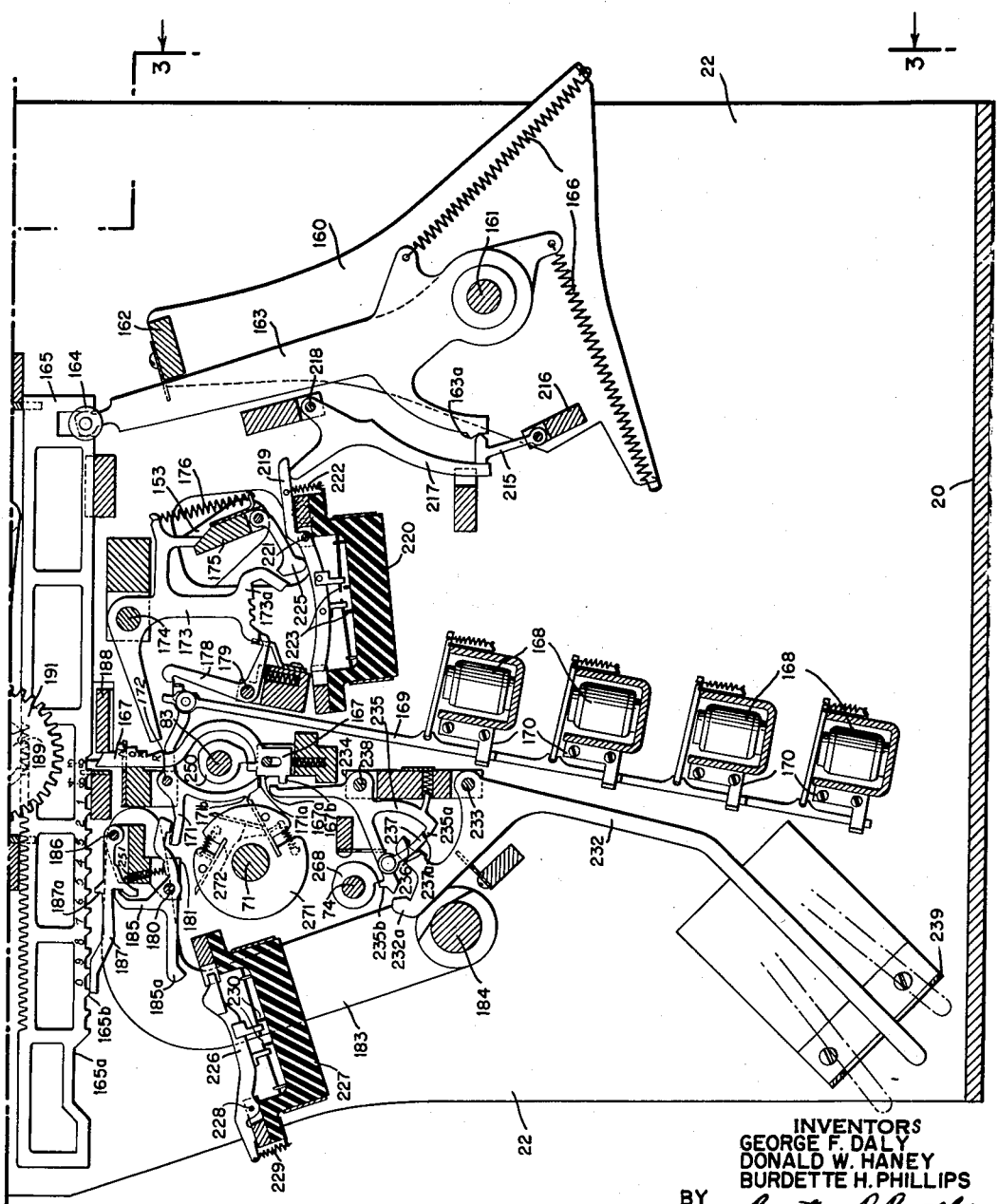

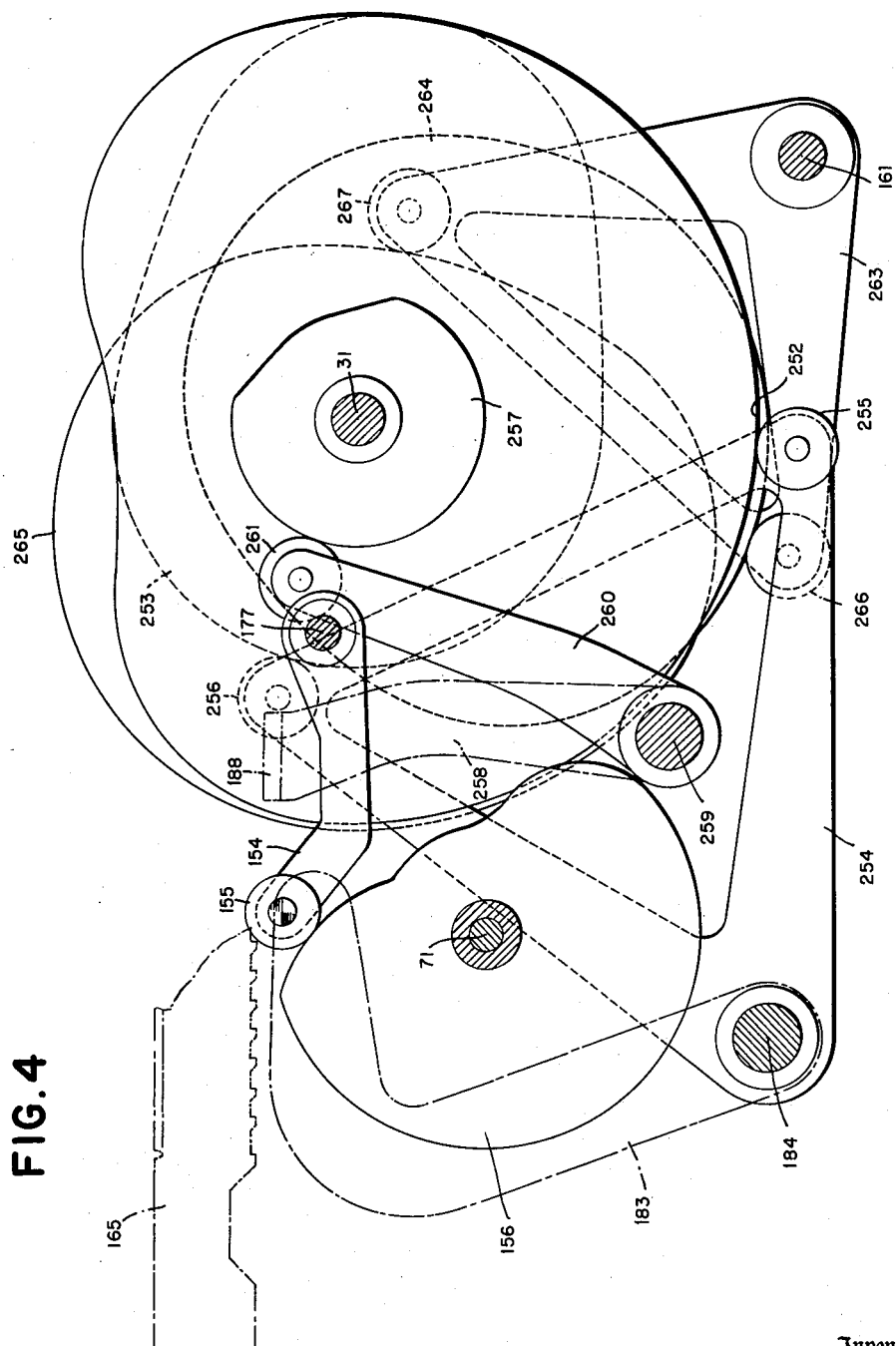

G. F. DALY ET AL 2,753,793

ALPHABETIC INTERPRETER

Filed May 19, 1953

INVENTORS
GEORGE F. DALY
DONALD W. HANEY
BURDETTE H. PHILLIPS
BY Burton P. Beatty
ATTORNEY July 10, 1956 G. F. DALY ET AL 2,753,793
ALPHABETIC INTERPRETER
Filed May 19, 1953 13 Sheets-Sheet 6

Inventors
GEORGE F. DALY
DONALD W. HANEY
BURDETTE H. PHILLIPS
BY Burton P. Beatty
Attorney July 10, 1956

G. F. DALY ET AL 2,753,793

ALPHABETIC INTERPRETER

Filed May 19, 1953

INVENTORS
GEORGE F. DALY
DONALD W. HANEY
BURDETTE H. PHILLIPS
BY Burton P. Beatty
ATTORNEY July 10, 1956
G. F. DALY ET AL
2,753,793
ALPHABETIC INTERPRETER
Filed May 19, 1953
13 Sheets-Sheet 8
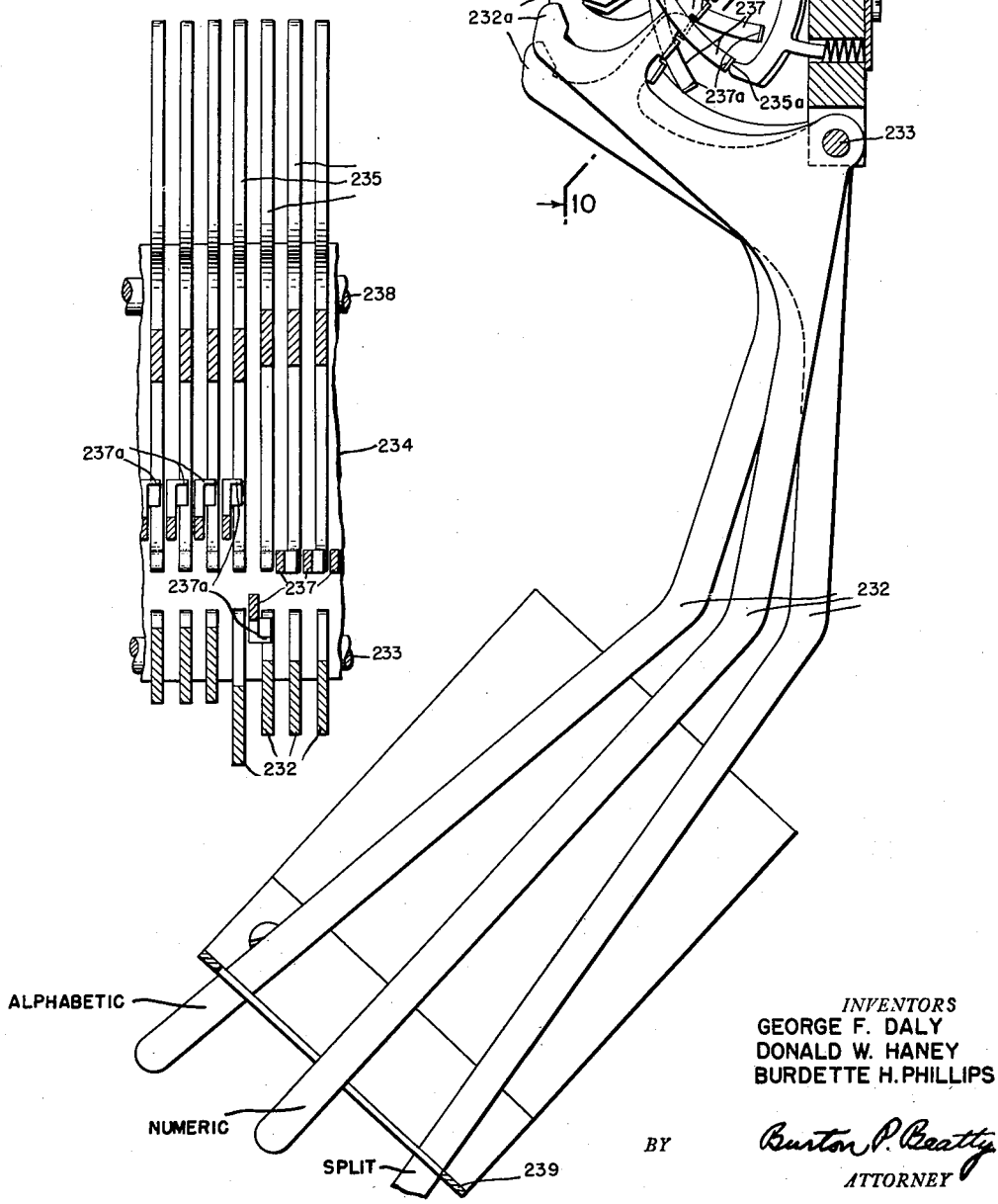
INVENTORS
GEORGE F. DALY
DONALD W. HANEY
BURDETTE H. PHILLIPS
BY Burton P. Beatty
ATTORNEY

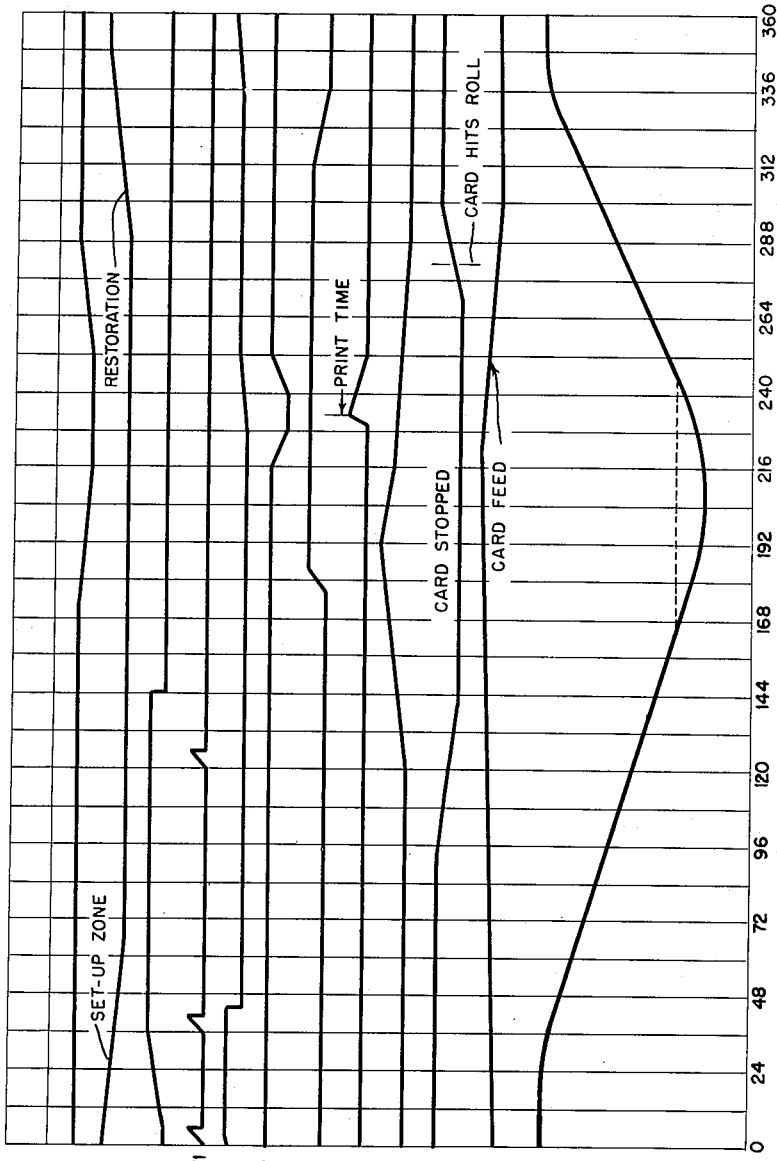

July 10, 1956  G. F. DALY ET AL  2,753,793
ALPHABETIC INTERPRETER
Filed May 19, 1953  13 Sheets-Sheet 10

INVENTORS
GEORGE F. DALY
DONALD W HANEY
BURDETTE H. PHILLIPS
BY Burton P. Beatty
ATTORNEY

INVENTORS
GEORGE F. DALY
DONALD W. HANEY
BURDETTE H. PHILLIPS

BY Burton P. Beatty
ATTORNEY

United States Patent Office 2,753,793  
Patented July 10, 1956

2,753,793
ALPHABETIC INTERPRETER

George F. Daly, Vestal, Donald W. Haney, Endicott, and Burdette H. Phillips, New York, N. Y., assignors to International Business Machines Corporation, New York, N. Y., a corporation of New York Application May 19, 1953, Serial No. 356,042

8 Claims. (Cl. 101—93)

This invention relates to printing machines and more particularly to the type known as interpreters in which character representing designations on record cards are analyzed and the characters represented thereby are printed back on the controlling record cards.

The principal object of the present invention is to provide an improved interpreter for interpreting numeric, alphabetic, and special character designations represented by combinational hole perforations in record card columns.

An object of the invention is to provide a novel print selector mechanism for such machines in which a high rate of speed may be attained.

Another object is to provide an improved zero suppression means for preventing the printing of zeros to the left of the first significant figure in a given field of numeric information.

In the present invention record cards as perforated to represent numeric, alphabetic, and special character designations contain twelve index point positions, nine of which represent digits, and the remaining three are known as zone perforations. A code for the combinational hole perforations is provided in which numeric characters are designated by a digit perforation, the alphabetic characters by zone and a digit perforation, and eight special characters by a zone perforation and two digit perforations. There are three additional special characters which are designated by a zone perforation alone. In the instance of the alphabetic characters and the eight special characters, the zone perforations are analyzed in advance of the digit perforations to preselect the zone, after which the digit perforations are analyzed to select a type element within the zone. In the case of the three special characters, a so-called hot zero impulse completes the selection of a type element.

Briefly, the printing machine of this invention includes a plurality of sets of feed rollers for successively feeding a series of perforated records past a line of analyzing brushes to successively read the index positions in each passing record. A movable rack is provided for positioning a type wheel in any printing position; the rack having a series of digit representing teeth thereon. A zone arm is positioned under control of the analyzing brushes in response to the reading of a perforation in a zone index position and a digit slide having zone steps thereon interrupts the rack by engagement therewith during movement of the rack in one direction. Means under control of the analyzing brushes operates the slide to engage a selected digit representing tooth on the rack in response to the sensing of a perforation in a digit index position. Means are provided for moving a selected zone step on the slide against the zone arm to finally position the rack, whereby the positioning of the type wheel is completed. Print impression mechanism then cooperates with the type wheel to cause printing on the record which has been read.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1a and 1b, arranged vertically in the order named, constitute a vertical section taken along lines 1—1 of Fig. 3, showing the card feeding, printing, and selector mechanism of the machine.

Fig. 4 is a sectional view taken along lines 4—4 of Fig. 3 showing the cams which control the functions of the selector mechanism.

Fig. 9 is a detail view of the zero suppression mechanism.

Fig. 10 is a sectional view taken along lines 10—10 of Fig. 9.

Fig. 11 is a chart showing the coding arrangement used for the data perforated in the record cards.

Fig. 12 is a timing diagram which can be followed to understand the various operations of mechanisms shown herein.

Fig. 13 is a timing chart showing the timing desirable to close certain electrical contacts and circuits.

Figure 14B:
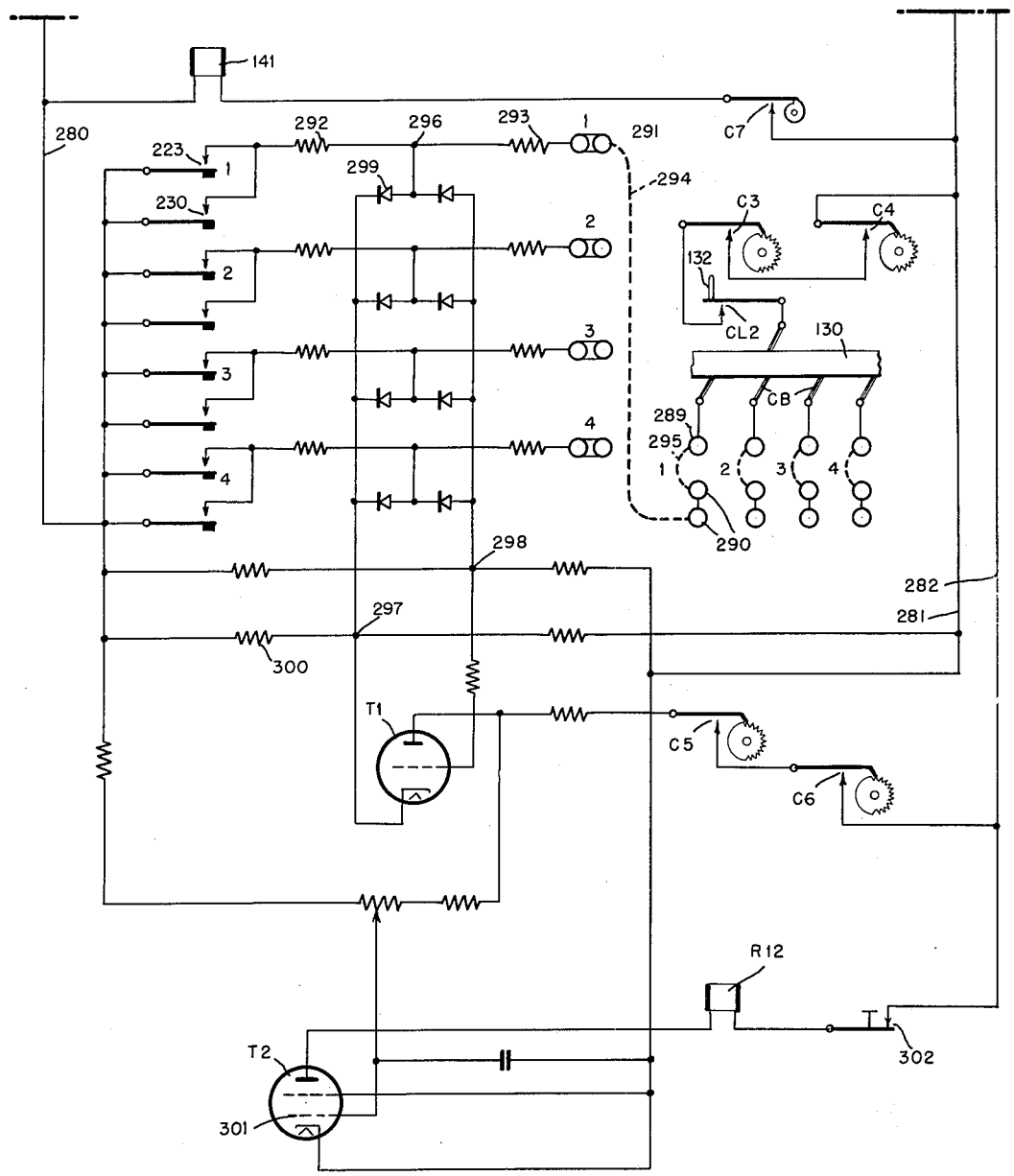

Figs. 14a and 14b placed one beneath the other comprise an electrical wiring diagram of the preferred form of the invention.

Main driving mechanism

Figure 2:
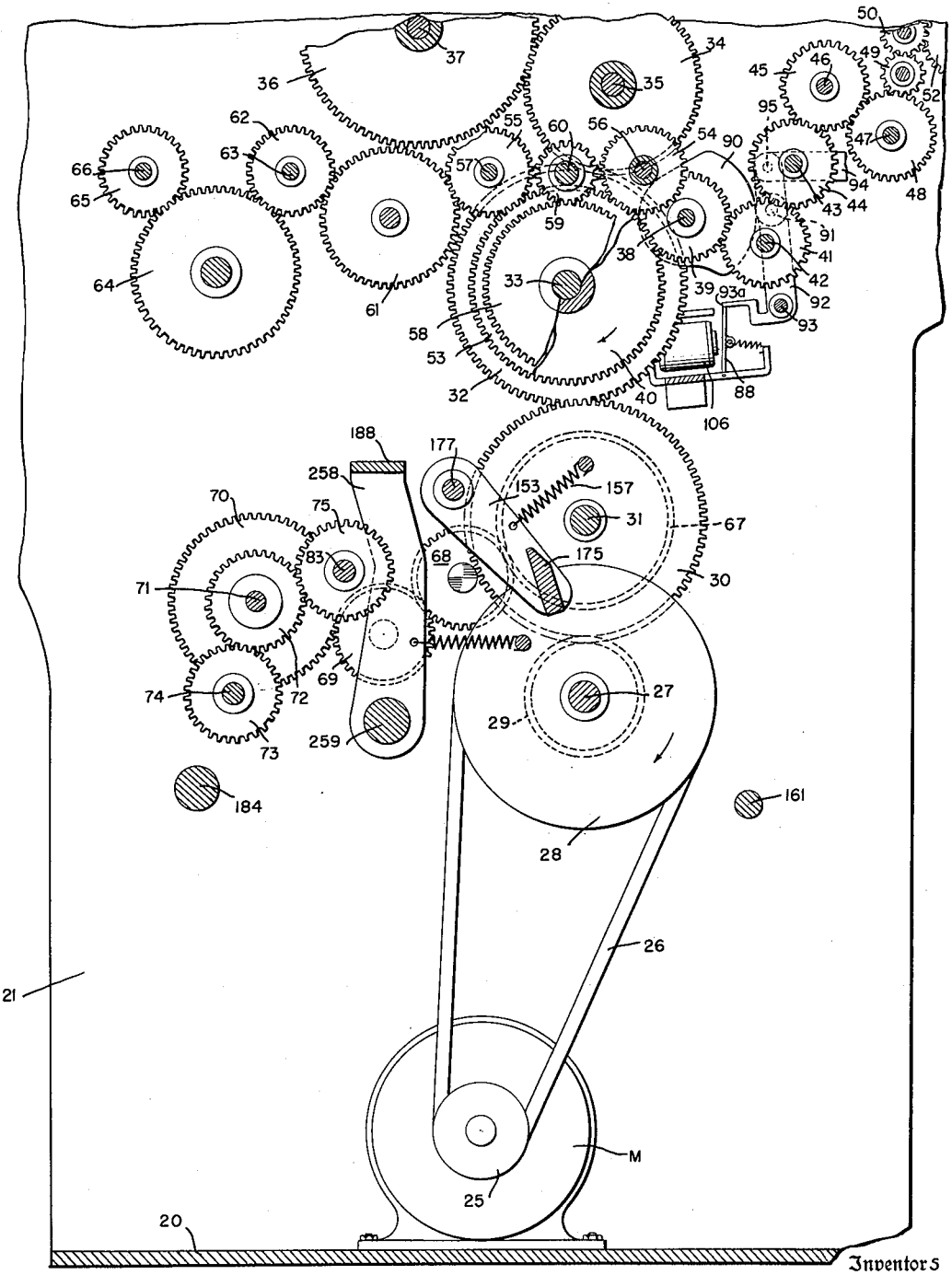
Fig. 2 is a sectional view taken along lines 2—2 of Fig. 3 showing the drive connections of the feeding and selecting mechanisms on one side of the machine.

The power or driving mechanism used to operate the selecting, printing, and various card feeding devices consists of an electric motor M, suitably mounted to a cross-frame member 20 of the machine, as shown in Fig. 2. The main framework of the machine comprises two vertical side frame plates 21 and 23 (Fig. 3) and middle frame plate 22. Plates 21 and 22 are interconnected by cross-frame member 20. The plates 24 extend between plates 21, 22 and 23. Motor M is provided with a small pulley 25, around which is drawn an endless belt 26. Secured to a main drive shaft 27 is a drive pulley 28, around which the endless belt 26 is passed. Motor M rotates shaft 27 continuously throughout the operation of the machine through endless belt 26, and shaft 27 in turn drives the mechanisms which perform the various machine operations mentioned above.

Again referring to Figs. 2 and 3, shaft 27 has secured thereto a spur gear 29 which is in mesh with a gear 30 fastened to a main camshaft 31 to drive the shaft continuously during machine operation. Camshaft 31 is mounted for rotation in frame plates 21 and 22. Gear 30 in turn meshes with a gear 32 fastened to an auxiliary camshaft 33 which is rotatably mounted in the frame plates 21, 22 and 23 and constantly driven during machine operation. Gear 32 engages an idler gear 34 which is freely mounted on a stud 35 projecting from middle frame plate 22. Idler gear 34 drives a gear 36 secured on a shaft 37 mounted for rotation in frame plates 21 and 22. This shaft 37 is constantly rotated and carries a number of contact operating cams which close contacts designated C1, C2, C3, C4, C5, C6 and C7. The timing and functioning of these devices will be set forth in connection with the explanation of the circuit diagram.

Figure 3:
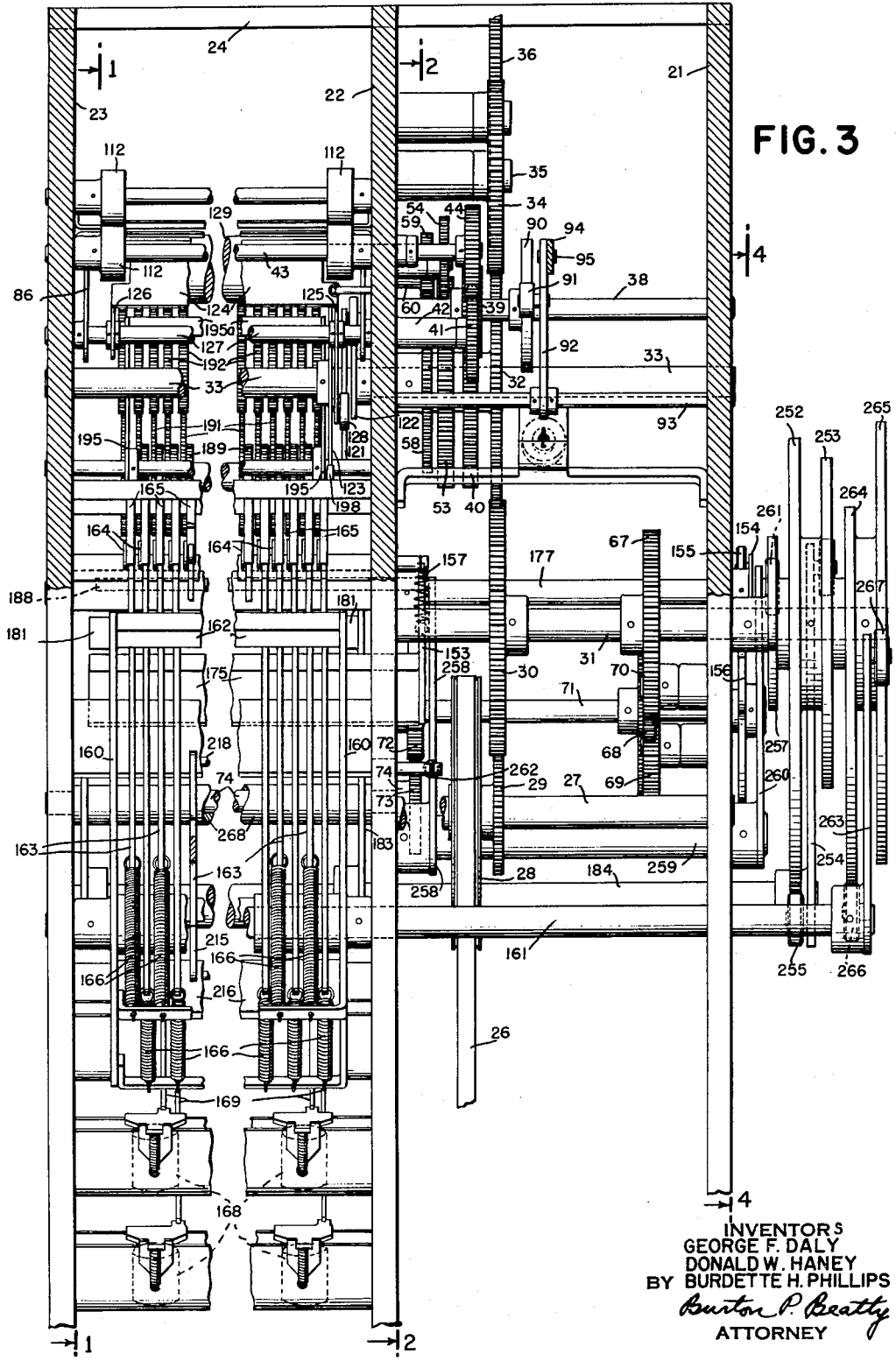
Fig. 3 is a sectional view taken along lines 3—3 of Figs. 1a and 1b.

A train of gears extends across the middle frame plate 22 to reach the drive connections for the feeding mechanisms which carry the record cards to and from the printing station, as shown in Figs. 2 and 3. It is already explained that auxiliary camshaft 33 is driven by gear 32 through the speed reduction gearing connected to the motor M. A second auxiliary camshaft 38 rides in frame plates 21 and 22 and has secured thereto a gear 39 which is engaged by a gear 40 fastened on auxiliary camshaft 33. Gear 40 rotates with auxiliary camshaft 33 to drive the second auxiliary camshaft 38 in a counterclockwise direction, as viewed in Fig. 2, through gear 39. An idler gear 41 is freely mounted on a stud 42 extending from frame plate 22. A feed roller shaft 43 rides in frame plates 22 and 23 and carries a gear 44 secured thereto on a portion which projects through plate 22. Gear 39 meshes with idler 41 which in turn transmits counterclockwise motion to gear 44. An idler gear 45 is mounted for rotation on a stud 46 projecting from frame plate 22. A feed roller shaft 47 rides in frame plates 22 and 23 and carries a gear 48 fastened thereto on a portion which extends through plate 22. Gear 44 meshes with idler 45 which in turn transmits counterclockwise motion to gear 48. A pair of small idler gears 49 and 50 are mounted for rotation on studs projecting from frame plate 22. A feed roller shaft 51 (Fig. 1a) is rotatably mounted in frame plates 22 and 23 and carries a gear 52 fastened thereto on a portion which projects through plate 22. Gear 48 transmits a counterclockwise motion to gear 52 through idlers 49 and 50.

A gear 53 (Figs. 2 and 3) secured to auxiliary camshaft 33 meshes with gears 54 and 55 fastened to feed roller shafts 56 and 57, respectively, which ride in frame plates 22 and 23. Shafts 56 and 57 are thus driven in a counterclockwise direction, as viewed in Fig. 2. Auxiliary camshaft 33 also carries a gear 58 which meshes with a small gear 59 secured to a contact roller shaft 60 supported for rotation in frame plates 22 and 23, thereby driving shaft 60 counterclockwise. These driving connections operate the mechanisms which carry the record cards to the printing station.

Gear 55 engages a large idler gear 61 (Fig. 2) which is in mesh with a gear 62 secured on a feed roller shaft 63. Gear 62 is in engagement with an idler gear 64 which in turn meshes with a gear 65 fastened to a feed roller shaft 66. Shafts 63 and 66 are supported for rotation in frame plates 22 and 23 and are driven in a counterclockwise direction through this gearing. These driving connections operate the mechanisms which carry the record cards away from the printing station.

A gear 67 is secured to the constantly rotating camshaft 31 and transmits motion to a gear 70 through idler gears 68 and 69, each of which is freely mounted on studs projecting inwardly from frame plate 21. Gear 70 is secured to a shaft 71 which rides in frame plates 21 and 22. A gear 72 is fastened to shaft 71 near frame plate 22 and in turn engages a gear 73 secured to an auxiliary camshaft 74 which carries the camming member for operating the zero suppression mechanism. This camshaft is rotatably mounted in frame plates 22 and 23 and is driven in a counterclockwise direction, as viewed in Fig. 2. Gear 72 meshes with another gear 75 secured to an auxiliary camshaft 83 which carries the camming member for operating the digit slide.

*Card feeding mechanism*

Referring to Figs. 1a and 3, auxiliary camshaft 38 has a cam 90 secured thereon which engages a follower roller 91 carried by an arm 92 to operate the card picker mechanism. This arm is pivotally mounted on a rod 93 extending between frame plates 21 and 22. A link 94 has a pivotal connection with arm 92 at 95 and with an arm 96 at 97. The arm 96 is freely mounted on a rod 98 and is urged in a counterclockwise direction by a spring 99 to constantly maintain roller 91 against cam 90 through link 94. The arm 96 carries a pin 100 which is adapted to fit within a slot in one end of a push rod 101. The other end of push rod 101 is secured to a bellcrank 102 through a pin connection 103. Bellcrank 102 is connected to a sliding pusher 104 through a pin 105. A knife member 89 is secured to one end of the pusher 104 for engaging the bottom card of the stack in magazine 107. The sliding pusher 104 is reciprocated by bellcrank 102, being moved first toward the left (Fig. 1a) and then back again toward the right into normal position. In Fig. 12 it is seen that cam 90 is so formed as to cause knife member 89 to engage the bottom card from 222° of a machine cycle until 300° at which time the card is removed from the magazine. Arm 92 has an extension 92a which is engageable by armature latch 88 of magnet 106. The arm 92 is prevented from rotating counterclockwise on rod 93 by latch 88. When magnet 106 is energized, armature 88 is withdrawn from engagement with extension 92a to permit arm 92 to pivot freely about rod 93. The lowermost card in magazine 107 is thereby advanced through the usual throat to a first pair of feed rollers 108 and 109 secured on shafts 51 and 110, respectively. Rollers 109 are frictionally driven through upper rollers 108.

The cards are advanced to the printing station through succeeding pairs of rollers 111, 112, 113 and 114 (Fig. 1a) which are driven by shafts 47, 43, 56 and 57, respectively, as previously explained, the upper rollers being frictionally driven from the lower rollers in each pair. The pair designated 113 are skid rollers which are spring pressed against a record card moving between them, so that when a card is halted against the timing shutter, the feed rollers continue to rotate frictionally against the face of the card. The upper rollers of pair 113 are rotatably mounted on a rod 115 which is supported between a pair of arms 116. An arm 116 is pivotally connected to each frame plate 22 and 23 to permit the upper rollers 113 to rest on the top of a card when the card is moved against a stop plate 124. A coil spring 117 urges the upper rollers 113 against the lower rollers with the required amount of pressure to allow for the friction drive. The upper rollers of pair 114 are similarly mounted, being rotatably positioned on a rod 118 which is supported between a pair of arms 119. An arm 119 is pivotally connected to each frame plate 22 and 23, and a coil spring 120 urges the upper rollers 114 against the lower rollers.

A trio of cams 121, 122 and 123 are secured to auxiliary camshaft 33 near frame plate 22 (Figs. 1a, 3) and are constantly rotating during machine operation. These cams control various card feeding operations and the type aligner mechanism. The feed rollers 112 advance the cards against stop plate 124 secured on arms 125 and 126. These arms in turn are pivotally mounted on a rod 127 which extends between frame plates 22 and 23.

*Timing shutter operating mechanism.*—The plate 124 is called a timing shutter in that it intercepts the card and then releases it for further advance at a definite time, so that if in its journey to this point there has been some slippage, it will be brought back into correct time relationship with the machine. On the lower end of arm 125 is a roller 128 which is spring pressed against cam 121 on shaft 33. From Fig. 12 it is seen that roller 128 engages the low portion of cam 121 at approximately 93° in the machine cycle to permit arm 125 to swing clockwise, as viewed in Fig. 2a, and raise stop plate 124 into the path of an advancing card. The card is stopped against stop plate 124 at 156° and later released at approximately 270° when the plate is again withdrawn. Feed rollers 113 then advance the card to the sensing station.

*The reading station.*—A line of analyzing brushes RB (Fig. 1a) are located at the reading station to read the coded perforations in each record card as it passes beneath the brushes. These brushes RB make wiping contact with a common contact roller 129 mounted on the constantly rotating shaft 60. Spaced a distance beyond brushes RB is a second row of brushes designated CB and identified as the checking brushes. The distance between the brushes RB and CB is two cycle points. A contact plate 130 is mounted beneath the brushes CB and cooperates with these brushes which again read the perforations. These brushes RB and CB, contact roller 129, and contact plate 130 are of conventional structure such as is commonly used in electrically controlled interpreting machines.

*Card lever contacts.*—Between the feed rollers 113 and the contact roller 129 is located the usual card lever 131 which is rocked about its pivot by a passing card to close the usual card lever contacts CL1. Located between contact roller 129 and card lever 131 is a second card lever 132 which may also be rocked about its pivot to close the usual card lever contacts CL2.

*Dispatching rollers.*—The rollers 114 dispatch the cards from the reading station to the printing station at the proper time in each cycle for the printing operation. The arm 119 near frame plate 22 has a cam portion 119a which cooperates with a camming surface 86a on one end of an arm 86. The other end of arm 86 is freely mounted on rod 127. Arm 86 carries a roller 87 which is maintained in constant engagement with cam 122 by the weight of the arm. When roller 87 reaches the high portion of cam 122, arm 86 is moved upwardly to raise arm 119 through the action of surface 86a against cam portion 119a of arm 119. This raising of arm 119 causes the upper rollers 114 to separate from the lower rollers 114, thereby preventing any positive feeding action by these rollers. Referring to Fig. 12, it is seen that the upper rollers 114 are separated from lower rollers 114 from 183° to 312° of a machine cycle whereupon the rollers again close to the card feeding position. It is noted that rollers 114 are open at the printing time to prevent excessive pressure of a card against the card stop located at the printing station which is described hereinafter.

*Card positioning stop mechanism.*—At the printing station (Figs. 1a, 8) is located a mechanism which functions to stop the card in any one of twenty-five positions to present any one of twenty-five lines of the card to receive printing from a row of type wheels. This mechanism comprises a stop or shutter 133 resting on a support rod 134 which extends between frame plates 22 and 23. This stop is pivotally mounted on one end to a pair of movable racks 135 through a pair of ears 136 extending upwardly from stop 133. The other end of stop 133 has a turned down portion 133a which projects into the path of the advancing record cards. The racks 135 are slidably supported to each frame plate 22 and 23 by studs 137 which extend into slots in each rack 135. A shaft 138 extends from frame plate 22 and through frame plate 23 where a knob 139 is secured to the shaft. A pair of pinions 140 are fastened to shaft 138 above the movable racks 135 to mesh with gear teeth on the upper surface of the racks. It is thus seen that the stop 133 can be positioned by hand to a predetermined setting through knob 139.

A solenoid 141 is rigidly mounted to a bracket 142 fastened to frame plates 22 and 23. This solenoid is so positioned that its core is adjacent to the upper surface of stop 133. Energization of solenoid 141 causes its core to pull the stop 133 upwardly at any of the twenty-five printing positions. After each printing operation, the solenoid 141 is energized, as explained hereinafter in connection with the circuit diagram, to raise stop 133 out of the path of the printed card.

After the printing operation, the cards are advanced to the usual card stacker mechanism (not shown) through succeeding pairs of rollers 143 and 144 (Fig. 1a) which are driven by shafts 63 and 66, respectively, as previously explained, the upper rollers being frictionally driven from the lower rollers in each pair.

*Alphabetic printing mechanism*

During the explanation of the card feeding mechanism, it was pointed out that a card can be stopped in a plurality of printing positions opposite type wheels 192 (Fig. 1a). The manner in which these wheels are adjusted will now be set forth.

*Print selector mechanism.*—Referring now to Figs. 1b and 3, a type rack follower arm 160 is fastened on a shaft 161 and carries a crosshead or bail 162. Shaft 161 is mounted for rotation in frame plates 21, 22 and 23 and has a triangularly shaped cam follower 263 fastened thereto outside of frame plate 21 (Fig. 4). A pair of complementary cams 264 and 265 are secured to the main camshaft 31 and are engaged by a pair of rollers 266 and 267 carried by cam follower 263. These cams act to positively rock the shaft 161 during each machine cycle of operation. In Fig. 1b follower arm 160 is shown in a neutral position before commencing a print selecting operation. Pivotally mounted on shaft 161 is a rack arm 163 which is provided with a roller 164 at its upper end. This roller rides freely in a slotted portion of a rack 165 to form a slidable connection between rack arm 163 and rack 165. This rack 165 is free to reciprocate in suitable support members. Rack arm 163 is urged against crosshead 162 by spring 166 which is secured to the follower arm 160. From Fig. 12 it is seen that at approximately 42° index timing the crosshead 162 moves upwardly under the influence of cams 264 and 265 and rack arm 163 follows it which in turn moves the rack 165 to the right with uniform motion. At 210° the crosshead 162 starts to restore and continues until 336°. The upward movement of the crosshead permits the rack 165 to move to the right under pressure of spring 166 until it is stopped by a spring pressed digit slide 167, as explained hereinafter. This slide is mounted on a vertically slidable pivot pin 224. For purposes of this invention four type wheels and associated selector mechanisms are shown in Fig. 3, but it should be understood that any suitable number may be provided without departing from the spirit of this invention.

The print selecting mechanism operates on the principle of positioning the rack 165 (Fig. 1b) in one of forty-seven positions and, by means of an intermediate gear, rotating a type wheel to present the character corresponding to the selected rack position at the printing line. The various rack positions are obtained from combinational hole perforations of the code shown in Fig. 11. The numeric positions are represented by the large rack teeth 165b numbered 1 through 9 on the bottom portion of the rack 165. The zone positions are represented by four steps R, X, O and N cut in the digit slide 167 which stops rack 165 on its travel to the right to set up a type wheel. Special characters are set up using the rack teeth designated 8–3 and 8–4. In setting up numeric and alphabetic characters, the rack 165 is positioned by the digit slide 167 first engaging one of the numeric teeth to stop the rack and then moving to the right until a zone step is engaged to complete the set-up. Therefore, each numeric tooth 165b may be associated with any one of four zone steps and stop the rack in four different positions for each rack tooth. Eight of the special characters are set up in a similar manner by utilizing the 8–3 and 8–4 teeth. Three of the special characters have a single code designation in a zone index point position, and a hot zero impulse is used to permit the digit slide 167 to intercept rack 165 at the proper time to engage a numeric tooth. These three special characters are zero (0), minus (—), and ampersand (&).

For the purpose of this description, we will assume that an asterisk (*) is to be set up on the type wheel and printed. Referring to the code chart of Fig. 11, it is seen that a card must be punched in the X, 4 and 8 positions to effect the printing of an asterisk. Since the cards are fed through the reading brushes RB with the R or 12 index position first, the X index position is the first perforation sensed. This position will be read between 17° and 24° index timing, as shown in Fig. 13. A print magnet 168 (Fig. 1b) is energized through the sensing of this perforation in the X position, as described hereinafter in connection with the description of the circuit diagram. It should be noted that a magnet 168 is provided in each order to operate mechanisms identical with those about to be described. The armature of magnet 168 engages a link 169 which is suitably mounted for reciprocation and held in the position shown by a support member 170. The upper end of link 169 is pivotally connected to a trigger 171 which is freely mounted on a stud 172. The lower arm of trigger 171 has a turned out flange 171a which is adapted for positioning in the path of a projection 167a on digit slide 167. As long as the trigger 171 is in the inoperative position shown in Fig. 1b, the digit slide is prevented from moving upwardly. When magnet 168 is energized, the armature is moved against the core, and link 169 rotates trigger 171 about stud 172 in a clockwise direction, as viewed in Fig. 1b, to remove flange 171a from the path of projection 167a.

Figure 5:
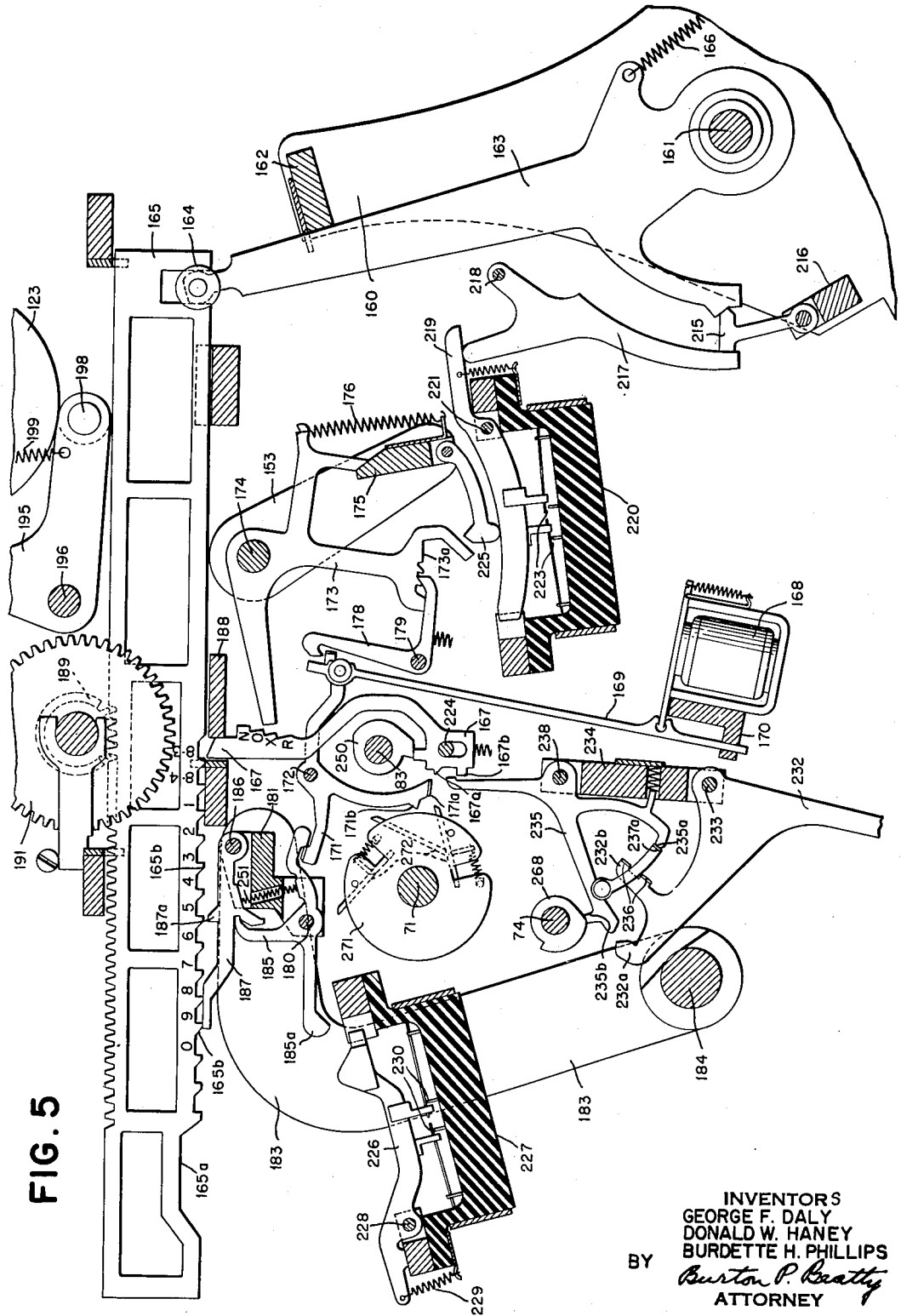
Fig. 5 is a vertical section through the selector mechanism showing the relative positions of the parts in the first step of setting up an "X" zone for printing an asterisk.

A zone arm 173 is freely mounted on a stud 174 and is engaged by a bail 175 projecting through an opening in frame plate 22. A coil spring 176 extends between the zone arm 173 and bail 175 to constantly urge these members toward engagement. Bail 175 is carried by an arm 153 (Figs. 2, 3) secured to a shaft 177 which rides in frame plates 21 and 22. A cam follower arm 154 (Fig. 4) is fastened to shaft 177 near frame plate 21 and carries a roller 155 which engages a cam 156 secured to constantly driven shaft 71. A spring 157 extends between arm 153 and frame plate 22 to maintain roller 155 against cam 156. From Fig. 12 it is seen that zone arm cam 156 moves bail 175 counterclockwise at 0°, as viewed in Fig. 1b, which in turn allows zone arm 173 to rotate clockwise to a position where its second or X notch is opposite the lower end of a spring pressed latch 178 pivotally mounted on a stud 179 (Fig. 5). Bail 175 moves clockwise until 66° index timing and remains in this position until 282° whereupon restoration is effected.

When the zone arm 173 started its clockwise movement, the lower end of latch 178 left the high tooth on zone arm 173 causing a slight counterclockwise rotation of latch 178 and allowing the upper end of latch 178 to stop against the upper right arm of trigger 171. Thus, it is seen that the clockwise movement of trigger 171 at the time that the X perforation is sensed permits the upper end of latch 178 to pass over the upper right arm of trigger 171 while the lower end of the latch engages the X tooth in the zone arm 173, thereby positioning the upper end of the zone arm under the X step in the digit slide 167, as shown in Fig. 5. From Fig. 12 it is seen that the release of digit slide 167 during the reading of the R, X and 0 index point positions is prevented by the high dwell surface on a cam member 250 secured to constantly rotating shaft 83.

The trigger 171 is restored by a cam member 271 which is secured to constantly rotating shaft 71. This cam member carries three fingers designated 272 which project outwardly therefrom. When trigger 171 is in the clockwise position described above, a raised portion 171b on the lower arm of the trigger lies in the path of the fingers 272. From Fig. 12 it is seen that these fingers 272 are arranged on cam member 271 to engage the portion 171b of trigger 171 at the 12 time, 1 time and 8 time respectively to restore the trigger at these times. In this manner a single print magnet 168 and associated trigger mechanism may be used to set up numeric and alphabetic data and special characters.

Figure 6:
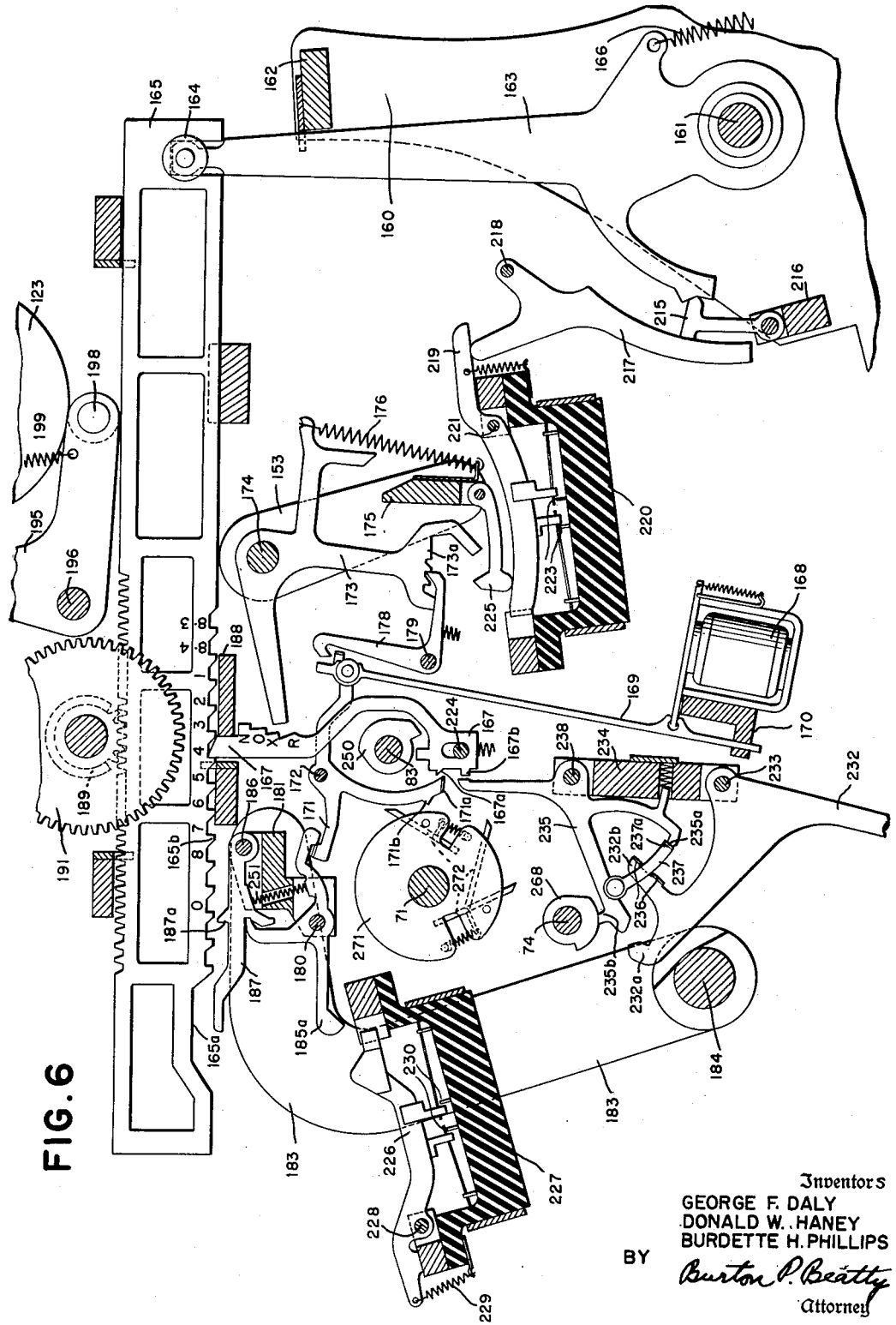
Fig. 6 is a vertical section similar to Fig. 5, showing the relative positions of the parts in the second step of setting up a "4" for printing an asterisk.

The next perforation to pass the sensing brushes is in the 4 index point position. This position is read between 77° and 84° index timing (Fig. 12) and causes magnet 168 in the related order again to be energized through a circuit described later. Link 169 again rotates the trigger 171 in a clockwise direction to allow digit slide 167 to engage the 4 tooth on rack 165 and stop the rack in its travel. The relative position of the various members is shown in Fig. 6. A second zone impulse is not effected at this time since the zone arms 173 which had not received a zone impulse had moved to the neutral position to allow clearance between the upper end of latch 178 and trigger 171.

The last perforation to pass the sensing brushes in the code group for printing an asterisk is in the 8 index point position. This position is read between 125° and 132° index timing (Fig. 12). A special character bail 181 is secured to a pair of arms 183 which are fastened to a shaft 184 riding in frame plates 21 and 22. The bail 181 is of comb structure having rods 189 and 186 extending therethrough. A latching member 185 is pivotally mounted on rod 189 and cooperates with a pawl 187 which is pivotally mounted on rod 186 and is provided with a tooth 187a projecting from its upper surface toward rack 165. A compression spring 251 extends between the latch 185 and the pawl 187 to constantly urge the latch toward latching engagement with the pawl. A pair of complementary cams 252 and 253 are secured to the main camshaft 31 (Fig. 3). A triangularly shaped cam follower 254 (Fig. 4) is fastened to shaft 184 and carries a pair of rollers 255 and 256 which engage cams 252 and 253, respectively. These cams act to positively rock the shaft 184 during each machine cycle. Referring to Fig. 12, it is seen that at approximately 117° the bail 181 is moved counterclockwise (Fig. 1b) by the complementary cams 252 and 253 and is continued until 192°.

Figure 7:
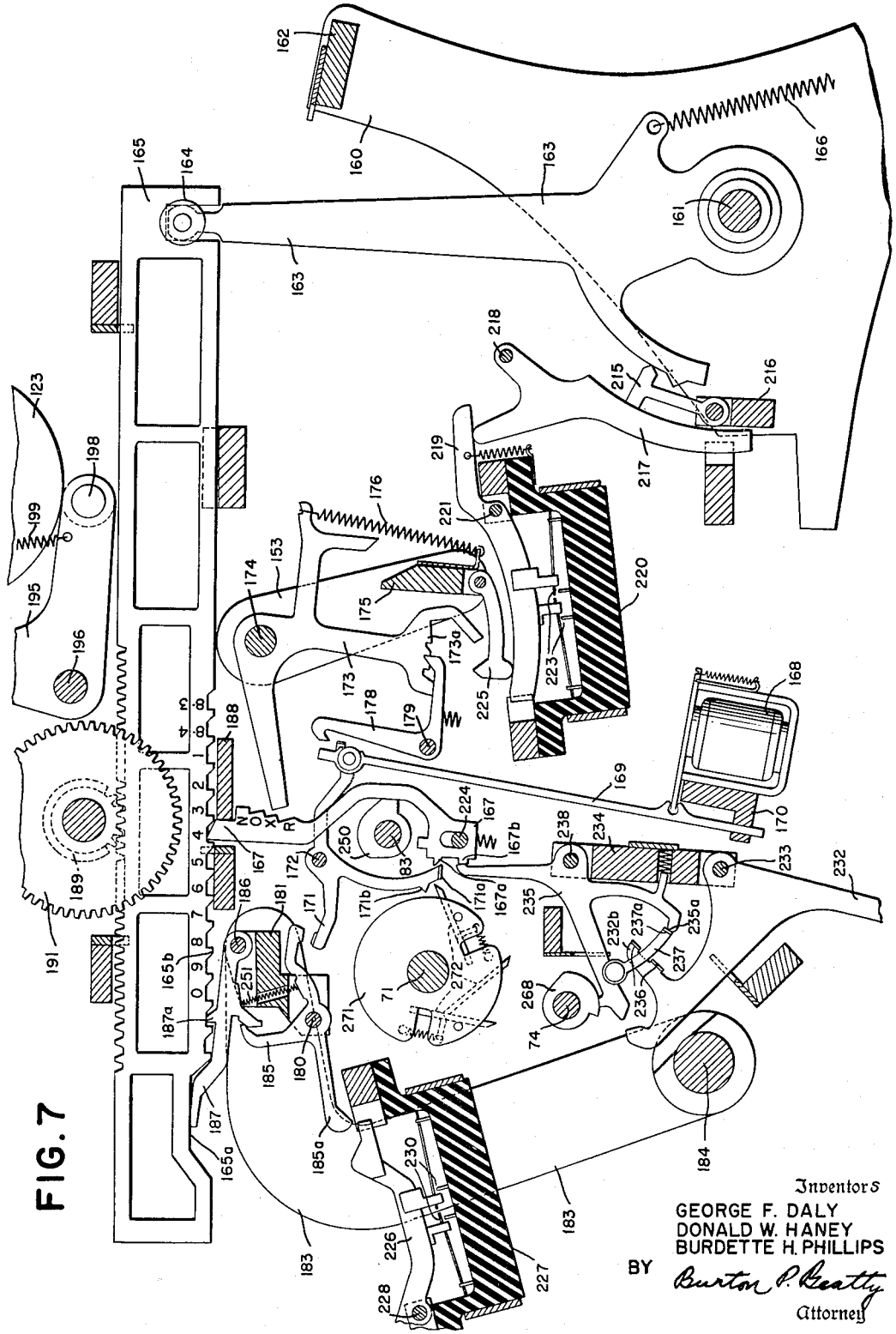
Fig. 7 is a vertical section similar to Fig. 6, showing the relative positions of the parts in the third step of setting up an "8" for printing an asterisk.

At the time that the 8 index position is read, the lower right end of latch 185 is positioned opposite the upper left arm of trigger 171. The magnet 168 is again energized, and trigger 171 is rotated clockwise to move latch 185 counterclockwise about rod 189, thereby releasing the pawl 187 for engagement of tooth 187a with the tooth which is in the furthest left position of rack 165, as shown in Fig. 7. During this time the bail 181 continues to move counterclockwise carrying rack 165 to the left until the tooth designated 8–4 drops over the digit slide 167. The rack 165 is thereby retracted to the position where the digit slide 167 engages the 8–4 tooth.

At 173° of the cycle (Fig. 12) a bail 188, which is positioned near the upper portion of digit slide 167, begins to move to the right (Fig. 1b), and the bail 181 begins to restore. A cam 257 is secured to the main camshaft 31 outside of frame plate 21 (Fig. 3). The bail 188 is carried by an arm 258 secured to a shaft 259 which rides in frame plates 21 and 22. A cam follower arm 260 (Fig. 4) is fastened to shaft 259 near frame plate 21 and carries a roller 261 which engages cam 257. A spring 262 extends between arm 258 and frame plate 22 to maintain roller 261 against cam 257. The digit slide 167 engages the bail 188 under pressure of rack arm spring 166 and follows the bail in its movement until the X step rests against the zone arm 173 which was positioned as previously explained. The set-up of an asterisk (*) at the printing line is thus completed. At 252° bail 188 starts to restore and continues until 288° where restoration is completed.

It should be noted that rack 165 has a notch 165a which permits the tooth 187a of special character pawl 187 to engage either of the two teeth in the furthest left position of the rack only when the rack has previously been stopped by the digit slide 167 in the 3 or 4 tooth. Thus, an impulse to magnet 168 from sensing a perforation in the 8 index point position alone or the sensing of a perforation in the 8 position with a zone will normally stop rack 165 with the 8 tooth on the digit slide 167, and although latch 185 has been released by trigger 171, the special character pawl 187 is prevented from engaging a tooth on rack 165 because the upper end of pawl 187 is riding on the high surface of the rack.

The foregoing is concerned with the setting up of the type wheel for printing the special character asterisk (*) which involves the sensing of three perforations in a single column by the reading brushes RB and is one of the most complicated of the character selections to be made. It should be realized that for the selection of numeric or alphabetic characters there will be less mechanism involved since the special character mechanism does not participate in the selection. For example, in setting up the numeric character three (3), only one perforation in the 3 index point position of a column is sensed by brushes RB to cause magnet 168 to be energized (Fig. 1b). The trigger 171 is rotated clockwise to allow digit slide 167 to engage the 3 tooth on rack 165 and stop the rack in its travel. Since no zone impulse was previously sent to magnet 168, the zone arm 173 returns to its normal position where the upper end is opposite the N step of digit slide 167 to prevent the slide from following bail 188 in its movement to the right. The set-up of the numeric character three (3) at the printing line is thus completed.

In setting up an alphabetic character such as the letter C, perforations are sensed in the R and 3 index point positions of a column by brushes RB. Magnet 168 is energized by the sensing of the R index point position to cause the upper end of zone arm 173 to be positioned opposite the R step of digit slide 167. Magnet 168 is again energized at the 3 time to allow digit slide 167 to engage the 3 tooth on rack 165 as before. The digit slide then follows bail 188 in its movement until the slide encounters the zone arm 173. The set-up of the alphabetic character C at the printing line is thus completed.

In setting up a special character such as minus (—), a perforation is sensed in the X index position of a column by brushes RB. Magnet 168 is energized by the sensing of the X index point position to cause the upper end of zone arm 173 to be positioned opposite the X step of digit slide 167. From Fig. 13 it is seen that a hot zero impulse is supplied to print magnet 168 at 149° index timing to again energize this magnet. The digit slide 167 is released to engage the tooth designated O on rack 165. The digit slide then follows bail 188 in its movement until the slide encounters the zone arm 173. The set-up of the special character minus (—) at the printing line is thus completed.

The rack 165 (Figs. 1a, 1b) is provided with a row of teeth on the upper surface which are in mesh with a small gear 189 secured to a shaft 190. Also fastened to shaft 190 is a large gear 191 which is in mesh with the lower segment of a type wheel 192, rotatably mounted on a rod 197, to position the wheel so that an asterisk is at the printing line. The periphery of wheel 192 is formed with fifty gear teeth 194 (Fig. 8), the ends of which are flattened to provide a type element face. Wheel 192 has a type element 193 for each of the characters shown in the perforation code of Fig. 11, there being only three blank positions. As the wheel is moved clockwise, the type elements 193 pass the printing line in the order in which they are arranged in Fig. 11 reading from left to right. A type aligner bail arm 195 is pivotally mounted at 196 and carries a roller 198 which is maintained in constant engagement with aligner bail cam 123 under influence of a spring 199. The aligner bail 195a is brought into engagement with the teeth 194 of wheel 192 at 216° index timing (Fig. 12) by the aligner bail cam 123. This device is operable to bring the type wheel 192 into perfect alignment for the printing operation which follows.

*Print bail operating mechanism.*—With the type wheel thus positioned, the printing platen is actuated to take an impression therefrom. This platen is shown at 200 in Figs. 1a and 8 carrying a print pad 210 and is supported by a pair of toggle links 201 and 202. Link 201 is pivotally mounted at 203 in a slotted portion of a support bracket 205. The upper portion of link 201 has an extension which carries a cam follower 206. This follower is held in constant engagement with a print cam 268 through a coil spring 207. This cam is secured on the constantly rotating shaft 37 between frame plates 22 and 23. Link 202 is pivotally connected to the lower portion of link 201 and to a rod 208 extending from platen 200. A vertically movable arm 209 extends from rod 208 to a support bar 213 and acts as a guide for the platen 200 when it is actuated. A second guide arm 211 extends from pivot 203 to rod 208 and serves to maintain the links 201 and 202 in proper operating alignment.

Figure 8:
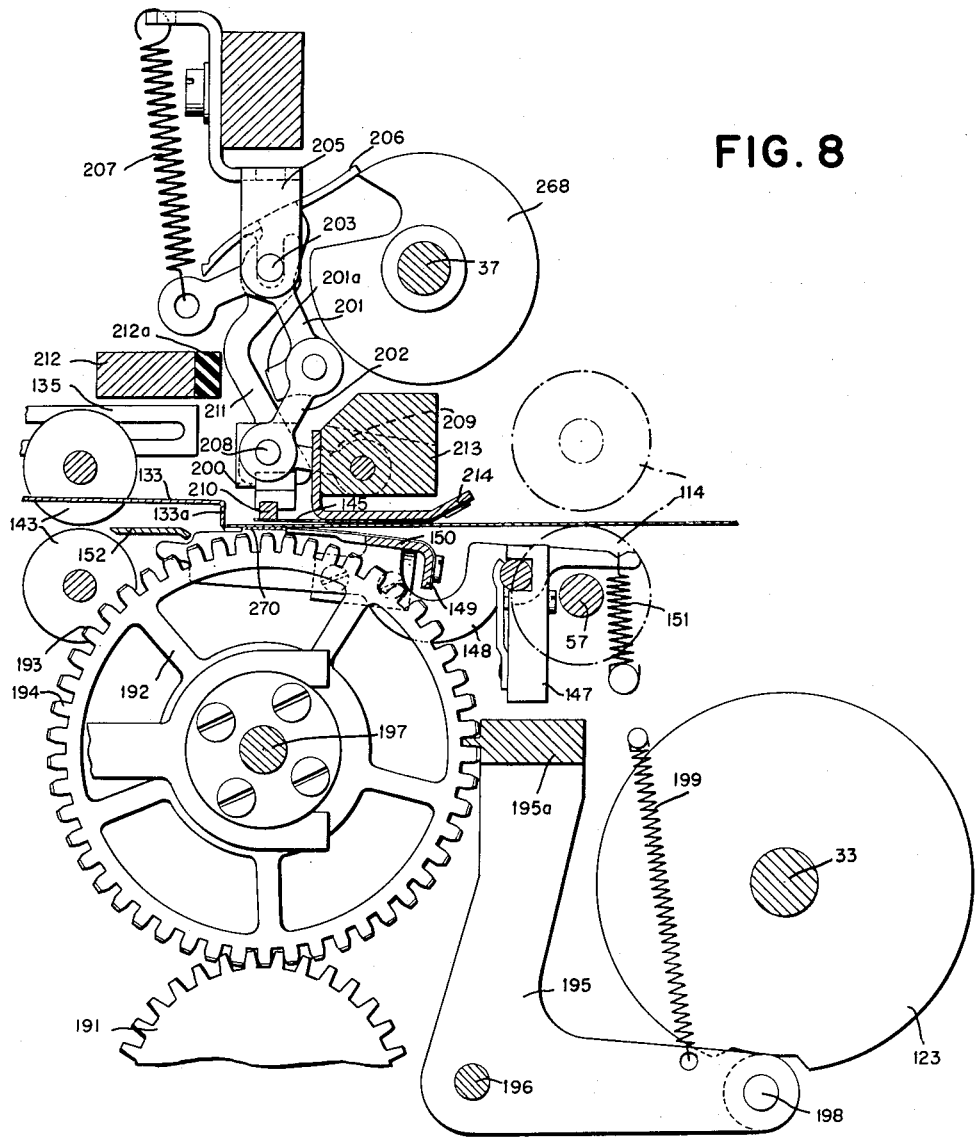
Fig. 8 is a detail view showing the card printing devices at the printing station.

At approximately 232° index timing (Fig. 12) cam follower 206 drops into the depression in print cam 268, and toggle links 201 and 202 straighten out under influence of spring 207 to move platen 200 downwardly. A stop member 212 having a rubber cushion 212a is positioned to the left of the toggle links, as shown in Fig. 8, and cooperates with a tail 201a on link 201 to limit the movement of the links during actuation. This movement drives print pad 210 against the card positioned between the type wheel 192 and the platen 200 to effect printing on the card of the character at the printing line at approximately 234°. At this time the platen 200 starts to restore and reaches a fully restored position at 252°.

An inking ribbon 270 is shown in Fig. 8 and extends across the type wheels 192 to permit an impression to be made on a card at the printing line. This ribbon 270 is fed by the usual ribbon feeding mechanism.

Mechanism is provided at the printing station (Fig. 8) to guide the cards therethrough and properly support them during the printing operation. A guide plate 145 is secured to a bracket 214 which extends between frame plates 22 and 23. This guide prevents the leading edge of the cards from engaging the vertical rear wall of the print pad 210 and causing a card jam at the printing station. A rod 146 is supported between a pair of brackets 147, one bracket being fastened to each frame plate 22 and 23. A support arm 148 is pivotally mounted on rod 146 near each bracket 147. These arms 148 are connected by an L-shaped bar 149 which is fastened to each arm. A plate 150 is secured to bar 149 and functions as a support for the cards at the printing line. A coil spring 151 is provided for each arm 148 to urge the arms in a clockwise direction about rod 146, as viewed in Fig. 1a, until a plate 152 is encountered. This plate 152 defines the upper limit of rotation of the arms and maintains the support plate 150 in operating position.

Mechanical checking mechanisms

*Digit checking.*—A T-shaped pawl 215 (Fig. 1b) is pivotally mounted on a bail 216 which in turn is secured to the type rack follower arm 160. An arm 217 is pivotally mounted on a rod 218 extending through a comb support member and rests against pawl 215 which holds it away from contact with rack arm 163. Pawl 215 is free to move within the space provided between rack arm 163 and arm 217. At 42° index timing pawl 215 moves upwardly with arm 160 which is under the influence of cams 264 and 265. The rack 165 begins to move to the right at 42° and is stopped at differential times as previously explained. Two cycle points after rack 165 is stopped, the pawl 215 encounters a projection 163a located at the lower end of rack arm 163. As pawl 215 moves upwardly and over this projection, arm 217 is moved clockwise about rod 218. The upper portion of arm 217 is in constant engagement with a contact closing arm 219 pivotally mounted on an insulating block 220 at 221 and urged in a clockwise direction by a spring 222. The clockwise movement of arm 217 moves arm 219 counterclockwise about pivot 221 causing contacts 223 to close. A similar set of contacts 223 are shown in the next lower order and are operated by similar mechanism (not shown). The closing of these contacts at the same time that the reading of the perforations by the checking brushes CB occurs completes a checking circuit which will be explained in detail hereinafter in connection with the circuit diagram.

*Zone checking.*—A pawl 225 (Fig. 1b) is pivotally mounted on the zone arm bail 175 and is adapted to ride freely on the upper surface of contact closing arm 219. When zone arm 173 moves counterclockwise about stud 174, pawl 225 engages the lower surface of a projection 173a of arm 173. Two cycle points after zone arm 173 is stopped by latch 178, the pawl 225 is forced downwardly by projection 173a to move contact closing arm 219 counterclockwise, thereby closing contacts 223. The closing of these contacts at the same time that the reading of the perforations by the checking brushes CB occurs completes a checking circuit in the same manner as for the digit checking and is explained in detail hereinafter.

*Special character checking.*—When the special character latch 185 has been operated by an impulse from a special character perforation in the 8 index point position, it will remain displaced counterclockwise (Fig. 1b) throughout the counterclockwise movement of special character bail 181. A projection 185a on latch 185 is then in position to engage a contact closing arm 226 pivotally mounted on an insulating block 227 at 228 and urged in a counterclockwise direction by a spring 229. Insulating block 227 is secured between arms 183. Two cycle points after the impulse from the 8 perforation, projection 185a engages a raised portion 226a on closing arm 226 to move this arm counterclockwise about pivot 228, causing contacts 230 to close. A similar set of contacts 230 are shown in the next lower order and are operated by similar mechanism (not shown). The closing of these contacts at the same time that the reading of the perforations by the checking brushes CB occurs completes a checking circuit which will be explained in detail hereinafter.

Zero suppression

Referring again to Figs. 1b and 9, a lever 232 is provided in each order and is pivotally mounted on a rod 233 extending through a comb support member 234. The lower end of lever 232 extends through an opening in a plate 239. The opening in plate 239 fits snugly around lever 232 to frictionally hold it in the numeric or normal position shown in full lines in Fig. 1b or in either the alphabetic or split positions shown in dotted lines in Fig. 1b. The upper end of lever 232 is forked to form two legs 232a and 232b. Leg 232b is provided with lugs 236 which project on either side of a carry lever 237 pivotally mounted on a spring pressed latch 235. This latch is pivotally mounted on a rod 238 extending through support member 234 and has a projection 235a and a cam follower portion 235b. The carry lever 237 has a turned out lug 237a projecting under the latch 235 in the adjacent column to the right which is in the next lower order as seen in Fig. 10.

With all the levers 232 in the numeric position shown in full lines in Fig. 1b, zeros are permitted to be printed across the machine to the left of any significant figure. The rocking of a lever 232 in any order in a counterclockwise direction about rod 233 will interrupt the repetition of a zero in the order to the right of such order. The functioning of the various parts will now be explained.

Referring now to Figs. 9 and 10, three levers 232 are shown in each of the three possible positions. The lever 232 in the nearest order in Fig. 9 is shown in the numeric or neutral position. The lever 232 in the next order is shown to be rotated counterclockwise about rod 233 to the split position. The lever 232 in the following order is shown to be rotated clockwise to the alphabetic position. Zeros are suppressed to the left of the highest order significant figure in a given field of numeric information by displacing the lever 232 downwardly to the split position in the units column of the card field to the left of the given field and in all columns to the left of this units column. All other levers 232 to the right remain in the numeric position. With the levers 232 thus moved in the units column of this field and in all columns to the left, the carry levers 237 are pivoted in a clockwise direction and moved out of the paths of projections 235a on the latches 235 which cooperate with the adjacent levers 232.

A cam member 268 is secured to the constantly rotating shaft 74 between frame plates 22 and 23 and is engaged by the cam follower portion 235b of latch 235. Just prior to the hot zero time which is 149° (Fig. 12), the cam follower portions 235b of all latches 235 drop off the high dwell of cam 268 to permit the latches to move clockwise in Fig. 2b and to allow the upper ends of latches 235 to fall over a projection 167b on each digit slide 167, thereby preventing operation of the slides 167 in columns punched with a 0 value. If a digit slide 167 has previously moved to engage the rack 165 as a result of a digit impulse, the upper end of the latch 235 will abut projection 167b to prevent any movement clockwise by the latch which simply rests upon the projection.

The latches 235 in all numeric orders to the right of the order with the highest significant figure (Fig. 10) are prevented from falling over the projection 167b of their respective digit slides 167 by the carry lever 237 in each column interfering with the projection 235a on the latch 235 in the column of the next lower order. It is thus seen that any zero to the right of a significant figure is allowed to print because the latch 235 for the zero position does not engage its cooperating digit slide projection 167b, and the ones to the left are suppressed. If a lever 232 is in the split position, the carry lever 237 of that order will not interfere with the latch 235 in the adjacent order, so that the adjacent latch is permitted to engage the projection 167b of the digit slide in this adjacent order, to prevent movement of the digit slide 167 at the hot zero time and thereby suppress the printing of a zero.

When the levers 232 are displaced upwardly to the alphabetic position, the legs 232a of levers 232 are moved to a position above latch cam followers 235b which prevent the latches 235 from moving clockwise when followers 235b leave the rise of the cam 268. Thus, the zero suppression mechanism is made inoperative in alphabetic fields, and the digit slide in each order is permitted to operate in the normal manner.

The circuit diagram

The circuit diagram (Figs. 14a and 14b) electrically coordinates the various mechanisms described hereinabove, and the manner in which the machine functions to cause printing from perforations on a card will now be explained in connection with the circuit diagram. There are several cam controlled contacts prefixed C, the timing of which is given in the chart (Fig. 13) to which reference may be made when tracing circuit paths. A number of relays are shown on the diagram, and in each case they are identified by the letter R. The contacts controlled by the relays are given the same reference character as the relays, followed by a lower case letter.

A number of wires in the circuit diagram terminate in plug sockets indicated by small circles between which connections are made in accordance with the particular requirements of the information to be printed by the machine. In the actual machine the plug sockets are extended to the rear of a plug-board (not shown) on which they are grouped and identified.

Referring to Fig. 14a, closure of the main starting switch S will condition the circuit for a start motor M for subsequent completion upon the energization of a relay R14 as later described. A suitable D. C. source provides 170 v. across a voltage divider 283 which extends between lines 280 and 282. The divider 283 is suitably tapped to furnish 40 v. on a line 281 as indicated. Closure of start key contacts 284 will establish a circuit from line 280 through the pick-up coil of a relay R10, start key contacts 284, normally closed "b" contacts of a check stop relay R12 to line 281. Energization of the start relay R10 closes its "a" contacts to complete a circuit through the hold coil of relay R10 as follows: From line 280, through the hold coil of relay R10, "a" contacts of relay R10, stop key contacts 285 (normally closed), normally closed "b" contacts of check stop relay R12 to line 281. The "b" contacts of relay R10 are also closed by the energization of relay R10 to complete a circuit through a motor control relay R14 as follows: From line 280, through relay R14, "b" contacts of relay R10 to line 281. The relay R14 closes its "a" contacts to supply current to the driving motor M through the A. C. circuit as indicated. In addition the closure of the "b" contacts of the start relay R10 causes the magnet 106 to be energized through the following circuit: From line 280, through magnet 106, relay contacts R10b to line 281. This magnet 106 controls the card feeding mechanism as explained in the mechanical description.

When the machine is thus placed in proper operation, the cards are fed from the magazine 107 to the reading station. As the leading edge of the first card engages card lever 131, the contacts CL1 are closed to permit subsequent completion of circuits controlled from the sensing of perforations as the index point positions of the record card traverse the analyzing brushes RB. In setting up the machine for operation, a plug connection is made from the plug socket 286 of a brush RB to the plug socket 287 of a selected column where printing is desired. For purposes of this description only four columns are shown in Fig. 14a, but it should be understood that there are eighty columns on each record card from which to read the perforated data and sixty possible printing positions. A print magnet 168 is associated with each printing position so that the plug sockets 286 can be connected to those particular plug sockets 287 in the printing positions desired.

For example, when a perforation is sensed by a brush RB in column 1, a circuit is completed to energize magnet 168 through cam contacts C1 and C2 which, from Fig. 13, it will be seen, are closed during the time that each perforation is analyzed by the brushes RB. Cam contacts C2 lag the cam contacts C1 in closing by 1° index timing. These contacts are closed by dentated cams which are driven by shaft 37 (Fig. 2) so as to rotate once for each machine cycle of operation. This circuit is traceable as follows: From line 280, through print magnet 168, plug socket 287, plug wire 288, plug socket 286, brush RB, common contact roller 129, card lever contacts CL1, cam contacts C1 and C2 to line 281.

Referring again to Fig. 13, a hot zero impulse is supplied to the print magnets 168 at hot zero time, which is one cycle point after the 9 index point time or 148° for cam contacts C1 and 149° for cam contacts C2. At the hot zero time the card has already passed the brushes RB, and the following card has not yet moved under the brushes. Therefore, the brushes RB are in contact with roller 129 to complete a circuit through the magnet 168 in each column similar to the one traced hereinbefore for a perforation sensed in column 1. This impulse permits a special character represented by a perforation in the R, X, or O index position alone to be printed. These characters are zero (0), minus (—), and ampersand (&). This impulse allows the digit slide 167 to engage the O tooth of its associated rack 165 and stop the rack in its travel. After the digit slide encounters the zone arm 173, the type wheel 192 is in position to print the special character. Without this impulse the type wheel 192 is moved to a blank position.

Referring now to Fig. 13, it is seen that cam contacts C7 are opened at 24° index timing to break the circuit through solenoid 141. This permits the card stop 133 (Fig. 1a) to drop into the path of an advancing record card at the printing station to position the card for the printing operation. At 240° index timing the contacts C7 are closed to again complete a circuit through solenoid 141 as follows: From line 280 through solenoid 141, cam contacts C7 to line 281. The energization of solenoid 141 at this time causes the stop 133 to be pulled upwardly and out of the path of the record card which has just received printed characters.

*Checking circuits.*—There are three possible errors which can occur because of faulty operation of the mechanical machine parts. The first occurs when a zone perforation in a card column is sensed by brushes RB, but the zone arm 173 (Fig. 1b) fails to be moved to a zone selecting position. The pawl 225 is not forced downwardly, and checking contacts 223 remain open. The second occurs when the rack 165 is not properly stopped by the digit slide 167 in response to the sensing of a digit perforation by brushes RB and the rack arm 163 follows bail 162 to the fully restored position. The pawl 215 is thus prevented from moving over the projection 163a on rack arm 163, and the contacts 223 again remain open. The third occurs when a special character perforation in the 8 index point position of a card column is sensed by brushes RB, but the special character latch 185 has not been displaced counterclockwise (Fig. 1b). The projection 185a on latch 185 is not then in position to engage contact closing arm 226 when bail 181 moves counterclockwise and the contacts 230 remain open. An error can also occur because of failure of the checking brushes CB to read a card perforation, although the checking contacts 223 and 230 are closed.

Each card perforation is sensed by the checking brushes CB two cycle points after it has been read by the sensing brushes RB (Fig. 13). At this checking time the sensing of a perforation under the brushes CB completes a checking circuit through the checking contacts 223 or 230, each of which is mechanically controlled from the print selector mechanism to close two cycle points after the print magnet 168 has received its impulse from the brushes RB. It should be noted that these contacts 223 and 230 are arranged in parallel in the checking circuit (Fig. 14b) so that closure of either contact can complete the circuit. Contacts 223 and 230 are closed for a single cycle point only, so that a direct comparison can be made between the perforation and the closure of contacts controlled from the set-up of the print selector mechanism corresponding to the perforation. The completion of a circuit through the checking brushes CB and a checking contact 223 or 230 at the same time permits the machine to continue in operation. However, a non-completion of this circuit through a dissimultaneous sensing of the perforation by brushes CB and closure of checking contacts 223 or 230 causes the checking circuit to operate and the machine to stop as later described.

After the leading edge of the first card has engaged the card lever 131 to close contacts CL1, a second card lever 132 is engaged, and contacts CL2 are closed to permit subsequent completion of the circuit controlled from the sensing of a perforation as the index point positions of the record card traverse the checking brushes CB. A plug connection is made from the plug socket 289 of a brush CB to the plug socket 290 of a selected column where printing is desired. A second plug connection is made from plug socket 290 to a plug socket 291 in the checking circuit which corresponds to that column.

For example, when a perforation is sensed by a brush CB in column 1, a circuit is completed through cam contacts C3 and C4 which, from Fig. 13, it will be seen, are closed during the time that each perforation is analyzed by the brushes CB. These cam contacts lag the contacts C1 and C2 by two cycle points and are closed by dentated cams which are driven by shaft 37 (Fig. 2) so as to rotate once for each machine cycle of operation.

This circuit is established as follows: From line 280, through the checking contacts 223 or 230 (whichever is closed), resistances 292 and 293, plug socket 291, plug wire 294, plug socket 290, plug wire 295, plug socket 289, brush CB, common contact plate 130, card lever contacts CL2, cam contacts C3 and C4 to line 281.

Two thyratron tubes designated T1 and T2 are provided in the output of the checking circuit to control the detection of an error. When no error has occurred, the junction point 296 of resistors 292 and 293 and the points 297 and 298 which determine the potentials of the cathode and grid, respectively, of tube T1 are all at the same potential. The closure of cam contacts C5 and C6 at the checking time (Fig. 13) causes the plate of tube T1 to become sufficiently positive with respect to the cathode of the tube T1 to conduct under the conditions stated above. When tube T1 is conducting, the control grid 301 of tube T2 becomes more negative with respect to its cathode, thereby preventing tube T2 from conducting. The check stop relay R12 is not then energized, and the machine continues to operate.

If an error has occurred because of faulty operation of the mechanical machine parts and either of the checking contacts 223 and 230 have remained open, the circuit through the checking brushes CB is not completed at the checking times. The current then passes through a crystal diode 299 and a resistor 300 and thence to line 280 to make the cathode of tube T1 more positive. Since the grid potential of tube T1 has not changed, the tube will not conduct. Therefore, when cam contacts C5 and C6 close at the checking time, the control grid 301 of tube T2 will become sufficiently positive with respect to its cathode for tube T2 to conduct. The firing of tube T2 establishes a circuit through the check stop relay R12 as follows: From line 282, reset key contacts 302 (normally closed), relay R12, tube T2 to line 281. Energization of check stop relay R12 closes its "a" contacts to complete a circuit through a signal light SL (Fig. 14a) as follows: From line 281 through signal light SL, "a" contacts of relay R12 to line 281. This circuit causes the signal light SL to indicate to the machine operator that an error has occurred.

The normally closed "b" contacts of relay R12 (Fig. 14a) are opened by the energization of this relay to break the circuit for the holding coil of the start relay R10. Deenergization of relay R10 causes its "b" contacts to open and break the circuit for the motor control relay R14. Deenergization of relay R14 causes its "a" contacts to open in the circuit to motor M and stop the machine. To reset the machine after an error, the reset key is depressed to open contacts 302 (Fig. 14b). The circuit to the plate of tube T2 is opened, and the tube ceases to conduct, thereby causing the check stop relay R12 to deenergize.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a printing machine, means for successively feeding a series of perforated records having zone designating index point positions and digit designating positions, means for successively reading the index points in each passing record, a type carrying member, a rack for positioning said member in any printing position, said rack having a series of digit representing means, means for moving said rack, a zone arm, means under control of said reading means for moving said arm to a predetermined position in response to the sensing of a perforation in a zone index position, a rack intercepting element with zone steps thereon, means under control of said reading means for operating said element to engage a selected digit representing means on said rack in response to the sensing of a perforation in a digit index position, means for moving a certain zone step on said element against said zone arm to finally position said rack, whereby the positioning of the type carrying member is completed, and means cooperating with said member to cause printing on the record which has been read.

2. In an interpreting machine for printing interpretations of characters represented on a record element by columns of index point positions in which perforations are placed in a zone position and a plurality of digit positions, means for feeding a series of said record elements, means for successively reading the index points in each passing element, a type carrying member, a rack for positioning said member in any printing position, said rack having a series of teeth representing digits and special characters and a plurality of extra special character teeth, means for moving said rack, a zone arm, means under control of said reading means for positioning said zone arm in response to the sensing of a perforation in a zone index position, a digit slide for intercepting said rack, means under control of said reading means for causing said slide to engage a selected digit tooth on said rack in response to the sensing of a perforation in a digit index position, a pawl member, means under control of said reading means for releasing said pawl member to engage one of said plurality of extra teeth on said rack in response to the sensing of a perforation in a digit index position, means for causing said pawl member to engage the extra tooth, means to impart movement to said pawl member, whereby said pawl member engages the extra tooth and said rack is again placed in motion until a selected special character tooth drops over said digit slide, means for moving said digit slide against said zone arm to complete the positioning of the type carrying member, and means cooperating with said member to cause printing on the element which has been read.

3. In an interpreting machine for printing interpretations of characters represented on the record element by columns of index points in which an indicium is placed in any one of three zone positions to be representative of three special characters, means for successively feeding a series of said record elements, means for successively reading the index points in each passing element, a type carrying member, a rack for positioning said member in any printing position, said rack having a series of teeth representing digits and special characters, means for moving said rack, a zone arm, means under control of said reading means for positioning said zone arm in response to the sensing of an indicium in a zone index position, a digit slide for intercepting said rack by engagement therewith during movement of the rack in one direction, means under control of said reading means for causing said slide to engage a selected tooth on said rack in response to an impulse obtained by said reading means sensing the space between successive record elements, means for moving said digit slide against said zone arm to complete the positioning of the type carrying member, and means cooperating with said member to cause printing on the record element of the one special character corresponding to the zone position which has been read.

4. In an interpreting machine for printing interpretations of characters represented on a record element by columns of index positions in which perforations are placed in a zone position and a plurality of digit positions, means for feeding a series of said record elements, means for successively reading the index points in each passing element, a type carrying member, a rack for positioning said member in any printing position, said rack having a series of teeth representing digits and special characters and a plurality of extra special character teeth, means for moving said rack, a magnet, means for energizing said magnet in response to the sensing of a perforation in a zone index position by said reading means, a zone arm, means under control of said magnet for positioning said zone arm, a digit slide for intercepting said rack, said magnet being energized a second time by said energizing means in response to the sensing of a perforation in a digit index position, means under control of said maget for causing said slide to engage a selected digit tooth on said rack, a pawl member, said magnet being energized a third time by said energizing means in response to the sensing of a perforation in a digit index position, means under control of said magnet for releasing said pawl member to engage one of said plurality of extra teeth on said rack, means for causing said pawl member to engage said extra tooth, means to impart movement to said pawl member, whereby said pawl member engages the extra tooth and said rack is again placed in motion until a selected special character tooth drops over said digit slide, means for moving said digit slide against said zone arm to complete the positioning of the type carrying member, and means cooperating with said member to cause printing on the element which has been read.

5. In an interpreting machine for printing interpretations of characters represented on a record by columns of index point positions in which a designation is placed in an index position, the columns to the left of the designation for the highest significant digit being provided with zero designations, means for successively feeding a series of records, means for successively reading the index points in each passing record, a type carrying member in each column, an element for positioning each of said members in any printing position, means for moving said elements, means for intercepting said elements, means under control of said reading means for operating said intercepting means in response to an impulse obtained by said reading means sensing the space between successive records, and means settable in predetermined columns to render said intercepting means ineffective in all columns to the left of the column with the highest significant digit.

6. In an interpreting machine for printing interpretations of characters represented on a record by columns of index point positions in which a designation is placed in an index position, the columns to the left of the designation for the highest significant digit being provided with zero designations, means for successively feeding a series of records, means for successively reading the index points in each passing record, a type carrying member in each column normally positioned in a blank printing position, a rack for positioning each of said members in any printing position, means for reciprocating said racks, means for intercepting said racks during the second half of their reciprocation, means under control of said reading means for operating said intercepting means in response to an impulse obtained by said reading means sensing the space between successive records, and manipulative means operable in predetermined columns to render related intercepting means ineffective so that the corresponding racks move with an uninterrupted reciprocation and the related type members are returned to a blank position.

7. In an interpreting machine for printing interpretations of characters represented on a record by columns of index positions in which indicia are placed in a zone position and a plurality of digit positions, means for feeding a series of said records, means for successively reading the index points in each passing record, a type carrying member, an element for positioning said member in any printing position, said element having a series of portions representing digits and special characters and a plurality of extra special character portions, means for moving said element, an electrically controlled device, means for activating said device in response to the sensing of an indicium in a zone index position by said reading means, means positionable in response to the sensing of an indicium in a zone index position, means under control of said device for positioning said positionable means, means for intercepting said element, said device being activated a second time by said activating means in response to the sensing of an indicium in a digit index position, means under control of said device for causing said intercepting means to engage a selected digit portion on said element, a member for cooperatively engaging said element, said device being activated a third time by said activating means in response to the sensing of an indicium in a digit index position, means under control of said device for releasing the element engaging member to engage one of said plurality of extra portions on said element, means for causing the element engaging member to engage said extra portion, means to impart movement to said element engaging member, whereby said element engaging member engages the extra portion and said element is again placed in motion until a selected special character portion drops over said intercepting means, means for moving said intercepting means against said positionable means to complete the positioning of the type carrying member, and means cooperating with said type carrying member to cause printing on the record which has been read.

8. In an interpreting machine for printing interpretations of characters represented on a record by columns of index positions in which indica are placed in a zone position and a plurality of digit positions, means for feeding a series of said records, means for successively reading the index points in each passing record, a type carrying member, an element for positioning said member in any printing position, said element having a series of portions representing digits and special characters and a plurality of extra special character portions, means for moving said element, a control device, means for operating said device in response to the sensing of an indicium in a zone index position by said reading means, means positionable in response to the sensing of an indicium in a zone index position, means under control of said device for positioning said positionable means, means for intercepting said element, said device being operated a second time by said operating means in response to the sensing of an indicium in a digit index position, means under control of said device for causing said intercepting means to engage a selected digit portion on said element, a retracting means cooperating with said element, said device being operated a third time by said operating means in response to the sensing of digit index position, means under control of said device for releasing the retracting means to engage one of said plurality of extra portions on said element, means for causing the retracting means to engage said extra portion, means to impart movement to said retracting means, whereby said retracting means engages the extra portion and said element is again placed in motion until a selected special character portion drops over said intercepting means, means for moving said intercepting means against positionable means to complete the positioning of the type carrying member, and means cooperating with said type carrying member to cause printing on the record which has been read.

References Cited in the file of this patent

UNITED STATES PATENTS

| Number | Name | Date |
|---|---|---|
| 2,199,561 | Fuller | May 7, 1940 |
| 2,291,970 | Neumann-Lezius | Aug. 4, 1942 |
| 2,386,422 | Beattie | Oct. 9, 1945 |
| 2,424,076 | Buhler | July 15, 1947 |
| 2,566,944 | Last | Sept. 4, 1951 |
| 2,598,511 | Crowell | May 27, 1952 |
| 2,627,807 | Buhler | Feb. 10, 1953 |